(12) United States Patent
Obayashi et al.

(10) Patent No.: US 8,785,341 B2
(45) Date of Patent: Jul. 22, 2014

(54) METHOD OF REGENERATING EXHAUST GAS TREATMENT CATALYST AND EXHAUST GAS TREATMENT CATALYST OBTAINED BY THE METHOD

(75) Inventors: Yoshiaki Obayashi, Hiroshima (JP); Masashi Kiyosawa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 309 days.

(21) Appl. No.: 12/743,514

(22) PCT Filed: Oct. 27, 2008

(86) PCT No.: PCT/JP2008/069428
§ 371 (c)(1),
(2), (4) Date: Jul. 27, 2010

(87) PCT Pub. No.: WO2009/107276
PCT Pub. Date: Sep. 3, 2009

(65) Prior Publication Data
US 2010/0292070 A1 Nov. 18, 2010

(30) Foreign Application Priority Data

Feb. 29, 2008 (JP) ................................. 2008-049133
Jul. 4, 2008 (JP) ................................. 2008-175157

(51) Int. Cl.
*B01J 38/72* (2006.01)
*B01J 38/02* (2006.01)
*B01D 53/86* (2006.01)
*B01J 38/00* (2006.01)
*B01J 37/00* (2006.01)
*B01D 53/96* (2006.01)
*B01J 23/00* (2006.01)
*B01J 23/92* (2006.01)

(52) U.S. Cl.
CPC ............. *B01D 53/8625* (2013.01); *B01J 38/00* (2013.01); *B01J 37/0036* (2013.01); *B01D 53/96* (2013.01); *B01J 23/002* (2013.01); *B01J 23/92* (2013.01); *B01J 37/0009* (2013.01); *B01D 2255/20707* (2013.01); *B01D 2255/20723* (2013.01); *B01D 2255/20776* (2013.01); *B01D 2257/302* (2013.01); *B01J 2523/00* (2013.01); *B01J 2523/47* (2013.01); *B01J 2523/55* (2013.01); *B01J 2523/69* (2013.01)
USPC .............................................. 502/21; 502/56

(58) Field of Classification Search
CPC ...... B01J 2523/00; B01J 23/002; B01J 23/92; B01J 2523/47; B01J 2523/55; B01J 2523/69; B01J 37/0009; B01J 37/0036; B01J 38/00; B01D 2255/20707; B01D 2255/20723; B01D 2255/20776; B01D 2257/302; B01D 53/8625; B01D 53/96
USPC ....................................................... 502/20–56
See application file for complete search history.

(56) References Cited

U.S. PATENT DOCUMENTS

| 4,755,282 | A | 7/1988 | Samish et al. |
| 6,245,306 | B1 | 6/2001 | Miyazaki et al. |
| 2003/0130118 | A1 | 7/2003 | Koyama et al. |
| 2004/0180783 | A1* | 9/2004 | Nojima et al. ................. 502/309 |
| 2004/0251334 | A1* | 12/2004 | Lugmair et al. ........... 241/24.12 |
| 2005/0069675 | A1 | 3/2005 | Noguchi |
| 2006/0258531 | A1 | 11/2006 | Koyama et al. |
| 2007/0298958 | A1 | 12/2007 | Harada et al. |

FOREIGN PATENT DOCUMENTS

| GB | 1313574 | A | 4/1973 |
| JP | 60-038037 | A | 2/1985 |
| JP | 2001-340764 | A | 12/2001 |
| JP | 2001-340784 | A | 12/2001 |
| JP | 2004-000936 | A | 1/2004 |
| JP | 2005-126317 | A | 5/2005 |
| WO | 01/94009 | A1 | 12/2001 |

OTHER PUBLICATIONS

Supplementary European Search Report dated Aug. 18, 2011, issued in corresponding European Patent Application No. 08873002.3.

M. Marafi et al.; "A Novel Process for Recycling Spent Hydroprocessing Catalysts—An Economic Analysis"; "30412", In : Jun. 15, 2000, World Petroleum Congrs, Calgary, Canada, XP002656310.(cited in Supplementary European Search Report dated Aug. 18, 2011).

M. Marafi et al.; "Preparation of heavy oil hydrotreating catalyst from spent residue hydroprocessing catalysts" Catalysis Today, vol. 130, Dec. 2, 2007, pp. 421-428, XP002656309.(cited in Supplementary European Search Report dated Aug. 18, 2011).

M. Marafi et al.; "Utilization of Metal-Fouled Spent Residue Hydroprocessing Catalysts in the Preparation of an Active Hydrodemetallization Catalyst"; Ind. Eng. Chem. Res., vol. 46, Feb. 23, 2007, pp. 1968-1974, XP002656311.(cited in Supplementary European Search Report dated Aug. 18, 2011).

International Search Report of PCT/JP2008/069428, mailing date of Jan. 22, 2009.

\* cited by examiner

*Primary Examiner* — Jennifer A Smith

(74) *Attorney, Agent, or Firm* — Westerman, Hattori, Daniels & Adrian, LLP

(57) ABSTRACT

Provided is a method of regenerating an exhaust gas treatment catalyst 11 having ash adhered to a surface thereof. The method includes a crushing step S1 in which the exhaust gas treatment catalyst 11 is crushed such that 70 to 95 wt % of the whole exhaust gas treatment catalyst 11 becomes coarse pieces 12 having a size exceeding a threshold size S (any value in a range of 0.105 to 1.0 mm); a separating step S2 in which the fragments obtained by crushing the exhaust gas treatment catalyst 11 are separated into the coarse pieces 12 having a size exceeding threshold size S and fine particles 13 having a size not larger than the threshold size S; a pulverizing step S3 in which the coarse pieces 12 thus separated are pulverized to a fine powder having an average particle diameter of not larger than 0.1 mm; a kneading step S4 and a molding step S5 in which the fine powder is kneaded with other raw materials and molded into an exhaust gas treatment catalyst; and a drying step S6 and a calcining step S7 in which the molded precursor is dried and calcined to thus obtain a regenerated exhaust gas treatment catalyst 14.

9 Claims, 2 Drawing Sheets

METHOD OF REGENERATING EXHAUST GAS TREATMENT CATALYST AND EXHAUST GAS TREATMENT CATALYST OBTAINED BY THE METHOD

TECHNICAL FIELD

The present invention relates to a method of regenerating an exhaust gas treatment catalyst having ash adhered to a surface thereof, and an exhaust gas treatment catalyst obtained by the method. The present invention is extremely effective particularly when employed to regenerate a catalyst for treating exhaust gas from burned coal and removing nitrogen oxide in the exhaust gas.

BACKGROUND ART

A discharge line for exhaust gas from equipment, for example, a coal-fired boiler or the like, in which coal is burnt is provided with an exhaust gas treatment catalyst to treat nitrogen oxide ($NO_x$) in the exhaust gas. Such an exhaust gas treatment catalyst is obtained by the following process: catalyst components made of metal oxides such as titanium oxide ($TiO_2$), tungsten oxide ($WO_3$), and vanadium oxide ($V_2O_5$) are kneaded together with a binder, molded into a honeycomb shape so as to have multiple holes, and calcined. A reducing agent such as ammonia ($NH_3$) is flowed into the holes together with the exhaust gas to bring the nitrogen oxide in the exhaust gas and the reducing agent into contact with the wall surfaces of the holes. This enables the decomposition and removal of the nitrogen oxide.

While such an exhaust gas treatment catalyst is being used, ash (fly ash) generated by burning coal is continuously flowed into the holes together with exhaust gas. Thus, components such as calcium (Ca) in the fly ash are gradually adhered (to a thickness of several tens μm) on the inner wall surfaces of the holes. Such components inhibit the contact reaction, between the nitrogen oxide and the reducing agent on the catalyst surface. Additionally, the fly ash itself is partially deposited inside the holes, and gradually makes it hard for exhaust gas to flow into the holes. Eventually, the fly ash completely blocks and clogs the holes, accordingly lowering the denitration performance.

Against this background, the following proposals have been made for the exhaust gas treatment catalyst used for a predetermined period. For example, such a catalyst is pulverized, molded again, and calcined. Thereby, the aforementioned components in the fly ash that are adhered (to a thickness of several tens μm) on the inner wall surfaces of the holes and the fly ash that is deposited inside the holes are incorporated into the wall surfaces. Moreover, with such a process, fresh surfaces are exposed on the wall surfaces, enabling the reuse of the catalyst (see, for example, Patent Document 1 below and other documents). Meanwhile, after the pulverization, a port ion (50 wt % or less) of the catalyst is mixed with a fresh material thereof, molded, and calcined. Thereby, the amounts of the components and the fly ash incorporated into the wall surfaces are reduced, enabling the reuse of the catalyst (see, for example, Patent Document 2 below and other documents).

Patent Document 1: JP-A Sho 60-038037
Patent Document 2: JP-A 2001-340764

DISCLOSURE OF THE INVENTION

Problems to be Solved by the Invention

However, such regeneration methods proposed in Patent Documents 1 and 2 and other documents as described above have the following problems.

(1) Since the fly ash and so forth are mixed in the regenerated exhaust gas treatment catalyst, the amounts of the catalyst components per unit volume are reduced. This lowers the denitration performance per unit volume. Particularly, when fly ash is deposited to such an extent that the fly ash blocks and clogs the holes of the catalyst, the catalyst cannot be regenerated to have a sufficient denitration performance by the regeneration method as described above.

(2) Alkali metal components such as a sodium (Na) component and a potassium (K) component and alkaline earth metal components such as a magnesium (Mg) component and a calcium (Ca) component contained in the fly ash poison the catalyst components. Accordingly, the denitration performance is lowered.

(3) An iron (Fe) component contained in the fly ash oxidizes sulfur dioxide ($SO_2$) contained in exhaust gas, generating sulfur trioxide ($SO_3$). When sulfur trioxide ($SO_3$) comes into contact with water ($H_2O$) in the exhaust gas, sulfuric acid ($H_2SO_4$) is generated. This makes it likely for the exhaust gas line to corrode.

The present invention has been made in view of the above-described problems. An object of the present invention is to provide a method of regenerating an exhaust gas treatment catalyst, the method being capable of suppressing the lowering of the exhaust-gas treating performance and the oxidation of sulfur dioxide; and an exhaust gas treatment catalyst obtained by the method.

Means for Solving the Problems

To solve the above-described problems, a method of regenerating an exhaust gas treatment catalyst according to a first invention provides a method of regenerating an exhaust gas treatment catalyst having ash adhered to a surface thereof, the method characterized by comprising: a crushing step of crushing the exhaust gas treatment catalyst that has been used; a separating step of separating the crushed exhaust gas treatment catalyst into coarse pieces having a size exceeding a threshold size S and fine particles having a size not larger than the threshold size S; a pulverizing step of pulverizing the separated coarse pieces into a fine powder; a molding step of molding the pulverized fine powder as a raw material into an exhaust gas treatment catalyst; and a calcining step of calcining a molded precursor of the exhaust gas treatment catalyst, the method characterized in that the threshold size S has a value not smaller than 0.105 mm.

A method of regenerating an exhaust gas treatment catalyst according to a second invention provides the method of regenerating an exhaust gas treatment catalyst according to the first invention, characterized in that the crushing step is a step in which the exhaust gas treatment catalyst that has been used is crushed such that 70 to 95 wt % of the whole exhaust gas treatment catalyst that has been used becomes the coarse pieces having a size exceeding the threshold size S.

A method of regenerating an exhaust gas treatment catalyst according to a third invention provides the method of regenerating an exhaust gas treatment catalyst according to the second invention, characterized in that the threshold size S has a value not larger than 1.0 mm.

A method of regenerating an exhaust gas treatment catalyst according to a fourth invention provides the method of regenerating an exhaust gas treatment catalyst according to any one of the first to third inventions, characterized in that the pulverizing step is a step in which the coarse pieces is pulverized such that the fine powder has an average particle diameter not larger than 0.1 mm.

A method of regenerating an exhaust gas treatment catalyst according to a fifth invention provides the method of regenerating an exhaust gas treatment catalyst according to any one of the first to fourth inventions, characterized in that the exhaust gas treatment catalyst is used to treat exhaust gas from a burned coal.

A method of regenerating an exhaust gas treatment catalyst according to a sixth invention provides the method of regenerating an exhaust gas treatment catalyst according to the fifth invention, characterized in that the exhaust gas treatment catalyst is used to treat nitrogen oxide in the exhaust gas.

An exhaust gas treatment catalyst according to a seventh invention provides an exhaust gas treatment catalyst characterized by being regenerated by the method of regenerating an exhaust gas treatment catalyst according to any one of the first to sixth inventions.

Effects of the Invention

In the crushing step of the method of regenerating an exhaust gas treatment catalyst according to the present invention, a large portion of the exhaust gas treatment catalyst itself becomes coarse pieces having a size exceeding the threshold size S. Meanwhile, most of ash adhered to and deposited on the surface of the catalyst becomes fine particles having a size not larger than the threshold size S by impact in the crushing. Accordingly, when the coarse pieces having a size exceeding the threshold size S are separated from the fine particles having a size not larger than the threshold size S in the separating step, most of the ash can be easily removed from the exhaust gas treatment catalyst itself.

For this reason, ash is hardly included in the exhaust gas treatment catalyst according to the present invention which is regenerated by molding and calcining by use of a fine powder obtained in the pulverizing step in which the coarse pieces are pulverized. Accordingly, the amounts of catalyst components per unit volume can be made approximately the same as those in a newly-made exhaust gas treatment catalyst, and the denitration performance per unit volume can be made approximately equivalent to that of the newly-made exhaust gas treatment catalyst. In addition, the catalyst components can be substantially prevented from being poisoned by the poisonous components, and the lowering of the exhaust-gas treating performance can be greatly suppressed. Simultaneously, the oxidation of sulfur dioxide by the iron component can be substantially eliminated.

Therefore, the method of regenerating an exhaust gas treatment catalyst according to the present invention is capable of regenerating an exhaust gas treatment catalyst in which the lowering of the exhaust-gas treating performance and the oxidation of sulfur dioxide are suppressed. Thus, the exhaust gas treatment catalyst according to the present invention is capable of demonstrating performances that are approximately equivalent to those of a newly-made exhaust gas treatment catalyst.

BEST MODES FOR CARRYING OUT THE INVENTION

A method of regenerating an exhaust gas treatment catalyst according to the present invention and an exhaust gas treatment catalyst obtained by the method will be described on the basis of the drawings. However, the present invention is not limited only to embodiments described below.

<Main Embodiment>

Figure 1:
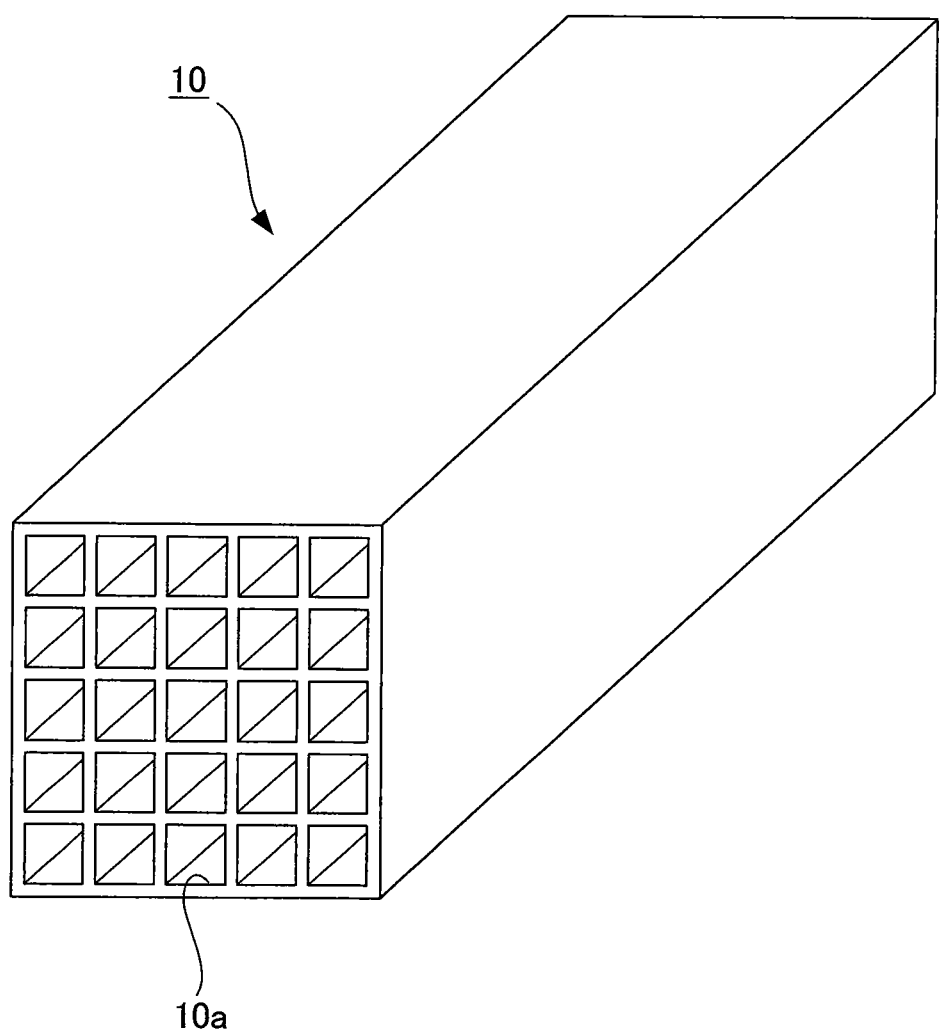
FIG. 1 shows a schematic configuration diagram of an exhaust gas treatment catalyst used in a main embodiment of a method of regenerating an exhaust gas treatment catalyst according to the present invention.
Figure 2:
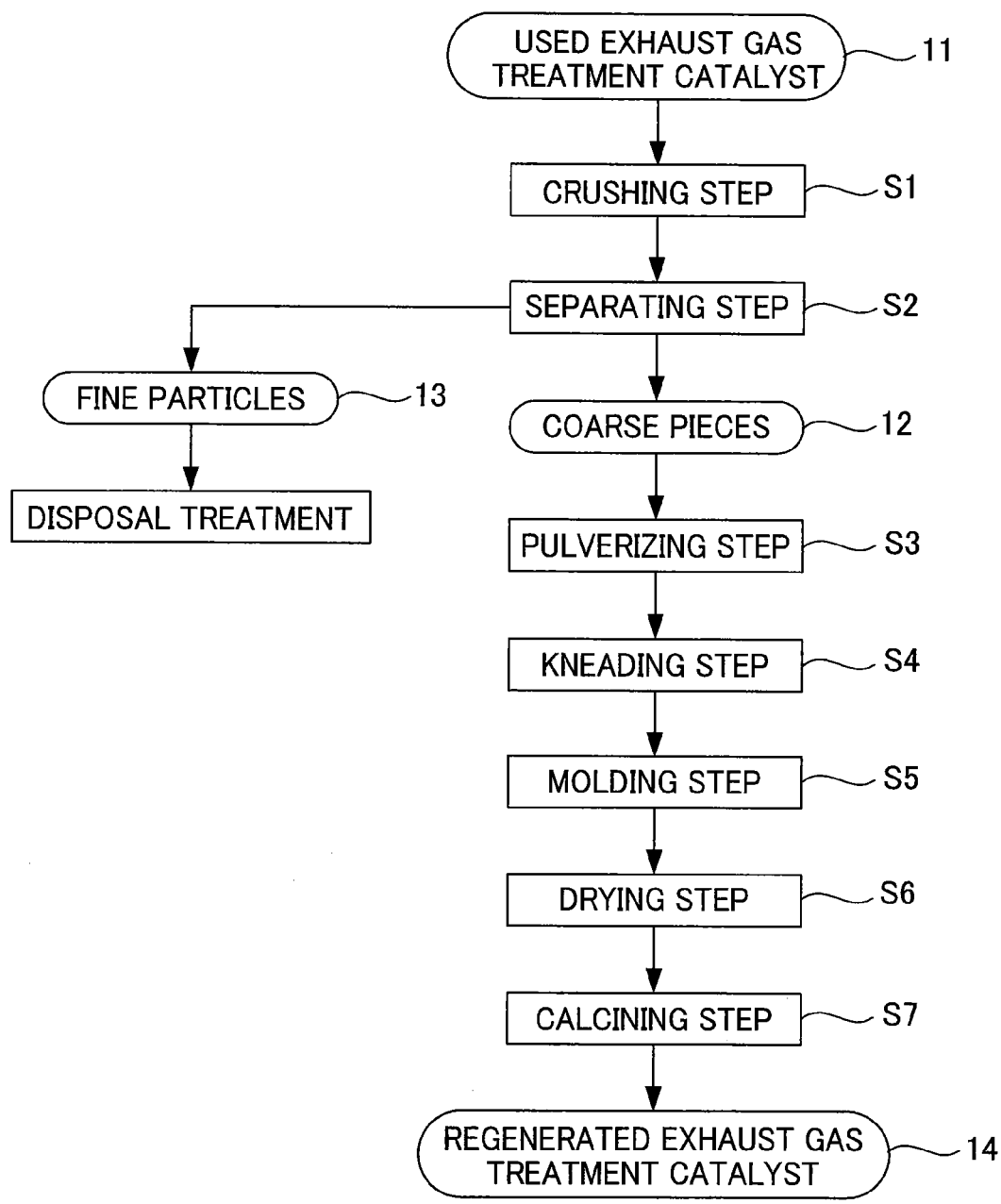
FIG. 2 shows a flowchart showing the procedure of the main embodiment of the method of regenerating an exhaust gas treatment catalyst according to the present invention.

A main embodiment of a method of regenerating an exhaust gas treatment catalyst according to the present invention and an exhaust gas treatment catalyst obtained by the method will be described on the basis of FIGS. 1 and 2. FIG. 1 is a schematic configuration diagram of the exhaust gas treatment catalyst. FIG. 2 is a flowchart showing the procedure of the method of regenerating an exhaust gas treatment catalyst.

As shown in FIG. 1, an exhaust gas treatment catalyst 10 according to the present embodiment is obtained by the following process: catalyst components made of metal oxides such as titanium oxide ($TiO_2$), tungsten oxide ($WO_3$), and vanadium oxide ($V_2O_5$) are kneaded together with a binder, molded into a honeycomb shape so as to have multiple holes 10a, and calcined.

Such an exhaust gas treatment catalyst 10 is installed in a discharge line for exhaust gas from equipment, such as a coal-fired boiler, for burning coal. A reducing agent such as ammonia ($NH_3$) is flowed into the holes 10a together with the exhaust gas to bring the nitrogen oxide ($NO_x$) in the exhaust gas and the reducing agent into contact with the wall surfaces of the holes 10a. This enables the decomposition and removal of the nitrogen oxide.

While the exhaust gas treatment catalyst 10 is being used, ash (fly ash) generated by burning the coal is continuously flowed into the holes 10a together with exhaust gas. Thus, components such as calcium (Ca) in the fly ash are gradually adhered (to a thickness of several tens μm) on the inner wall surfaces of the holes 10a. The components inhibit the contact reaction between the nitrogen oxide and the reducing agent on the surfaces of the holes 10a. Additionally, the fly ash itself is partially deposited inside the holes 10a, and gradually makes it hard for exhaust gas to flow into the holes. Eventually, the fly ash completely blocks and clogs the holes, accordingly lowering the denitration performance. For this reason, after a predetermined period of use, the catalyst is taken out from the exhaust gas line and transferred to a regeneration treatment facility.

Then, a used exhaust gas treatment catalyst 11 transferred to the regeneration treatment facility is introduced into a crushing machine, e.g., a crusher, without a washing treatment step using a washing liquid such as water. The catalyst is crushed so that 70 to 95 wt % of the whole exhaust gas treatment catalyst 11 becomes coarse pieces 12 having a size exceeding a threshold size S (any value in a range of 0.105 mm to 1.0 mm) (in FIG. 2, crushing step S1).

The fragments obtained by crushing the exhaust gas treatment catalyst 11 are supplied onto a sieve having a mesh size of the threshold size S. Then, the fragments are separated into the coarse pieces 12 having a size exceeding the threshold size S and fine particles 13 having a size not larger than the threshold size S (in FIG. 2, separating step S2).

The fine particles 13 passed through the mesh of the sieve are subjected to a disposal treatment. Meanwhile, the coarse pieces 12 left on the mesh of the sieve are introduced into a pulverizing machine, e.g., a hammermill, and pulverized to a fine powder having an average particle diameter of not larger than 0.1 mm (preferably, 70 μm) (in FIG. 2, pulverizing step S3).

Then, the fine powder is supplied as a raw material together with other ingredients such as a binder and water into a kneading machine, e.g., a kneader, and uniformly kneaded (in FIG. 2, kneading step S4). The kneaded product is supplied into an extruder and molded into a honeycomb shape (in FIG. 2, molding step S5). This molded precursor is naturally dried and subsequently dried with hot air (100° C.) or the like (in FIG. 2, drying step S6). Thereafter, the dried precursor is calcined in a calcining furnace (400 to 600° C.) (in FIG. 2, calcining step S7). Thus, a regenerated exhaust gas treatment catalyst 14 is obtained.

Specifically, when the used exhaust gas treatment catalyst 11 is subjected to the above-described crushing, a large portion (approximately 70 to 95 wt %) of the exhaust gas treatment catalyst itself becomes the coarse pieces 12 having a size exceeding the size S by the crushing with the crushing machine, e.g., a crusher. Meanwhile, most of the fly ash and so forth adhered to and deposited on the surface of the catalyst become the fine particles 13 having a size not larger than the size S by impact in the crushing with the crushing machine, e.g., a crusher. Accordingly, when the fragments obtained by the crushing are separated into the coarse pieces 12 having a size exceeding the size S and the fine particles 13 having a size not larger than the size S, most of the fly ash and so forth can be easily removed from the exhaust gas treatment catalyst itself.

For this reason, the fly ash and so forth are hardly included inside the wall surfaces of the exhaust gas treatment catalyst 14 that is regenerated by kneading, molding, drying, and calcining by use of, as the raw material, the fine powder obtained in the pulverizing step S3 of pulverizing the coarse pieces 12 obtained after the crushing step S1 and the separating step S2.

As a result, the following effects can be obtained from the regenerated exhaust gas treatment catalyst 14.

(1) The amounts of catalyst components per unit volume can be made approximately the same as those in a newly-made exhaust gas treatment catalyst 10. This can make the denitration performance per unit volume approximately equivalent to that of the newly-made exhaust gas treatment catalyst 10.

(2) Increases in the amounts of alkali metal components such as a sodium (Na) component and a potassium (K) component and alkaline earth metal components such as a magnesium (Mg) component and a calcium (Ca) component can be suppressed. This makes it possible to substantially prevent the catalyst components from being poisoned by these components, and to greatly suppress the lowering of the denitration performance.

(3) An increase in an iron (Fe) component can be suppressed. This substantially eliminates the generation of sulfur trioxide ($SO_3$) due to the oxidation of sulfur dioxide ($SO_2$) contained in exhaust gas. It becomes possible to greatly suppress the corrosion of the exhaust gas line by sulfuric acid ($H_2SO_4$) generated upon contact between sulfur trioxide ($SO_3$) and water ($H_2O$) in exhaust gas.

Therefore, the method of regenerating an exhaust gas treatment catalyst according to the present embodiment is capable of regenerating an exhaust gas treatment catalyst in which the lowering of the exhaust-gas treating performance and the oxidation of sulfur dioxide are suppressed. Thus, the exhaust gas treatment catalyst according to the present embodiment is capable of demonstrating performances that are approximately equivalent to those of a newly-made exhaust gas treatment catalyst.

Moreover, it is possible to remove fly ash and so forth from the used exhaust gas treatment catalyst without a washing treatment step using a washing liquid such as water. This allows a significant reduction in the amount of water disposed of in the regeneration treatment, and the regeneration treatment cost and environmental load can be greatly reduced.

Note that, in the crushing step S1, it is preferable to perform the crushing such that 70 to 95 wt % of the total weight of the used exhaust gas treatment catalyst 11 becomes the coarse pieces 12 as described above. This is because, if the coarse pieces 12 formed by the crushing is less than 70 wt % of the total weight of the used exhaust gas treatment catalyst 11, an excessive amount of the exhaust gas treatment catalyst is disposed of together with the fly ash and so forth. This consequently lowers the regeneration efficiency and increases the regeneration cost. Meanwhile, if the coarse pieces 12 formed by the crushing exceeds 95 wt % of the total weight of the used exhaust gas treatment catalyst 11, the fly ash and so forth may be incorporated into the regenerated exhaust gas treatment catalyst 14 by a large amount.

<Other Embodiments>

Note that, in the above-described embodiment, the description has been given of the case where the exhaust gas treatment catalyst 10 is molded into a honeycomb shape. However, the present invention is not limited thereto. As to other embodiments, in the case of an exhaust gas treatment catalyst molded into, for example, a pellet shape, pipe shape, or other shape, the prevent invention is also employable in a similar manner to the above-described embodiment.

Moreover, in the above-described embodiment, the description has been given of the case where the exhaust gas treatment catalyst 10 for denitration contains catalyst components made of metal oxides such as titanium oxide ($TiO_2$), tungsten oxide ($WO_3$), and vanadium oxide ($V_2O_5$). However, the present invention is not limited thereto. The present invention is employable even to an exhaust gas treatment catalyst for other than denitration which contains a catalyst component made of a different metal oxide, in a similar manner to the above-described embodiment.

Furthermore, in the above-described embodiment, the description has been given of the case where the exhaust gas treatment catalyst 10 is installed in the discharge line for exhaust gas from equipment, such as a coal-fired boiler, for burning coal. However, the present invention is not limited thereto. As long as ash in exhaust gas is adhered to and deposited on a surface of an exhaust gas treatment catalyst, the present invention is employable in a similar manner to the above-described embodiment.

EXAMPLES

Hereinafter, description will be given of a confirmation test to confirm the effects of the method of regenerating an exhaust gas treatment catalyst according to the present invention and the exhaust gas treatment catalyst obtained by the method. However, the present invention is not limited only to the confirmation test described below.

Example 1

A $TiO_2$—$WO_3$—$V_2O_5$-based exhaust gas treatment catalyst for denitration having a honeycomb shape (height: 150 mm, breadth: 150 mm, length: 800 mm, wall thickness: 1.15 mm, pitch (distance between the centers of adjacent walls):

7.4 mm, number of meshes (n): 20×20) was used in an exhaust gas line of a coal-fired boiler for approximately 70000 hours (percentage of clogged holes: approximately 3%). The catalyst was crushed with a crusher. The fragments obtained by crushing were screened with sieves respectively having mesh sizes of 0.074 mm, 0.105 mm, 0.150 mm, 0.212 mm, 0.297 mm, 0.5 mm, and 1.0 mm (the nominal dimensions are specified according to Japanese Industrial Standards (JIS)). Then, the weight percentages and composition percentages of the fine particles passed through the sieves and of the coarse pieces left on the sieves were obtained respectively. Tables 1 and 2 below show the result. Note that, for comparison, the composition percentages of a newly-made exhaust gas treatment catalyst are also shown in Tables 1 and 2 below.

rally dried and subsequently dried with hot air (100° C.×5 hours). Thereafter, the dried precursor was subjected to a calcining treatment (500° C.×3 hours) in a calcining furnace, and then cut into pieces (number of meshes: 6×7). In this manner, obtained were test samples 1 (screened product with the 0.5-mm mesh) and test samples 2 (screened product with the 0.074-mm mesh) of the regenerated exhaust gas treatment catalyst (two in each test sample).

Subsequently, under conditions described below, the denitration rates and $SO_2$ oxidation rates of the respective test samples 1 and 2 were obtained, and the $As_2O_3$ contents thereof were also obtained. Moreover, for comparison, prepared were: an exhaust gas treatment catalyst (test sample 3) regenerated under the same conditions as those of the test

TABLE 1

| | | Mesh size (mm) | | | | | | | | |
|---|---|---|---|---|---|---|---|---|---|---|
| | | 0.074 | | 0.105 | | 0.150 | | 0.212 | | |
| | | Coarse piece | Fine particle | Coarse piece | Fine particle | Coarse piece | Fine particle | Coarse piece | Fine particle | Newly-made product |
| Weight percentage (%) | | 97.0 | 3.0 | 95.0 | 5.0 | 93.0 | 7.0 | 91.5 | 8.5 | 100 |
| Composition percentage (%) | $TiO_2$ | 75.6 | 62.9 | 75.6 | 62.9 | 75.5 | 61.9 | 75.6 | 61.9 | 77.3 |
| | $V_2O_5$ | 0.50 | 0.43 | 0.50 | 0.43 | 0.50 | 0.43 | 0.49 | 0.42 | 0.53 |
| | $WO_3$ | 9.09 | 7.67 | 9.09 | 7.67 | 9.09 | 7.56 | 9.08 | 7.56 | 8.95 |
| | $SiO_2$ | 7.40 | 16.5 | 7.20 | 16.2 | 6.92 | 16.8 | 6.72 | 16.3 | 6.83 |
| | $Fe_2O_3$ | 0.29 | 1.40 | 0.25 | 1.20 | 0.23 | 1.20 | 0.22 | 1.11 | 0.15 |
| | $As_2O_3$ | 0.37 | | 0.37 | | 0.37 | | 0.36 | | 0.00 |
| | Others | 6.75 | 11.10 | 6.99 | 11.60 | 7.39 | 12.11 | 7.53 | 12.71 | 6.24 |

TABLE 2

| | | Mesh size (mm) | | | | | | |
|---|---|---|---|---|---|---|---|---|
| | | 0.297 | | 0.5 | | 1.0 | | |
| | | Coarse piece | Fine particle | Coarse piece | Fine particle | Coarse piece | Fine particle | Newly-made product |
| Weight percentage (%) | | 90.4 | 9.6 | 81.3 | 18.7 | 71.3 | 28.7 | 100 |
| Composition percentage (%) | $TiO_2$ | 74.8 | 64.0 | 75.4 | 67.6 | 75.6 | 67.9 | 77.3 |
| | $V_2O_5$ | 0.48 | 0.42 | 0.49 | 0.44 | 0.49 | 0.45 | 0.53 |
| | $WO_3$ | 8.60 | 7.51 | 8.70 | 7.87 | 8.79 | 7.92 | 8.95 |
| | $SiO_2$ | 6.75 | 15.3 | 6.72 | 12.5 | 6.80 | 12.5 | 6.83 |
| | $Fe_2O_3$ | 0.24 | 0.84 | 0.23 | 0.58 | 0.20 | 0.60 | 0.15 |
| | $As_2O_3$ | 0.37 | | 0.36 | | 0.39 | | 0.00 |
| | Others | 8.76 | 11.93 | 8.10 | 11.01 | 7.73 | 10.63 | 6.24 |

As seen from Tables 1 and 2 above, it was confirmed that the mesh sizes (threshold size S) set in a range of 0.105 to 1.0 mm were able to make the weight percentage of the coarse pieces in a range of 70 to 95%.

Example 2

Catalysts for treating exhaust gas were regenerated by using the coarse pieces screened with the sieves having mesh sizes of 0.5 mm and 0.074 mm, respectively, in Example 1 above. Specifically, each of the coarse pieces was pulverized (to have an average particle diameter of 20 μm) with a hammermill. The fine powder thus obtained (13 kg), an organic binder (0.9 kg), and water (adequate amount) were kneaded with a kneader and uniformly mixed. The obtained kneaded product was supplied into an extruder to prepare a precursor of an exhaust gas treatment catalyst, the catalyst having a honeycomb shape (height: 69 mm, breadth: 69 mm, length: 800 mm, mesh pitch: 7.4 mm, mesh opening: 6.25 mm, number of meshes (n): 9×9). The precursor was sufficiently natusamples 1 and 2 after mixing coarse pieces obtained under the conditions of the Example 1, except the omission of the screening (separation step), i.e., without removing fly ash; an exhaust gas treatment catalyst (test sample 4) before the regeneration treatment; and a newly-made exhaust gas treatment catalyst (test sample 5). The denitration rates and $SO_2$ oxidation rates thereof were obtained, and the $As_2O_3$ contents thereof were also obtained. Table 3 below shows the result. Note that, the denitration rate and the $SO_2$ oxidation rate were calculated according to equations described below.

Test Conditions
 Compositions of exhaust gas—
  $NO_x$: 150 ppm
  $NH_3$: 150 ppm
  $SO_2$: 800 ppm
  $O_2$: 4%
  $CO_2$: approximately 12.5%
  $H_2O$: approximately 11.5%
  $N_2$: balance
 Temperature of exhaust gas: 380° C.

Amount of exhaust gas: 19.97 Nm³/hr
$U_{gs}$: 2.3 Nm/sec
AV: 11.63 N³/m²·hr

Denitration rate(%)={1−($NO_x$ concentration at catalyst outlet/$NO_x$ concentration at catalyst inlet)}×100

$SO_2$ oxidation rate(%)={($SO_3$ concentration at catalyst outlet−$SO_3$ concentration at catalyst inlet)/$SO_2$ concentration at catalyst inlet}×100

TABLE 3

| Test sample | Denitration rate (%) | SO₂ oxidation rate (%) | As₂O₃ (%) |
|---|---|---|---|
| 1 | 95.8 | 0.95 | 0.36 |
| 2 | 95.0 | 1.16 | 0.37 |
| 3 | 94.4 | 1.37 | 0.36 |
| 4 | 83.5 | 0.84 | 0.37 |
| 5 | 96.2 | 0.93 | 0.00 |

As seen from Table 3 above, the test sample 2 (screened product with the 0.074-mm mesh) and the test sample 3 (product without screening) had improved denitration rates compared with that of the test sample 4 (used product having fly ash adhered thereto), but had greatly increased $SO_2$ oxidation rates more than those of the test sample 4 (used product having fly ash adhered thereto) and the test sample 5 (newly-made product).

In contrast, the test sample 1 (screened product with the 0.5-mm mesh) had an improved denitration rate compared with that of the test sample 4 (used product having fly ash adhered thereto), and also had a $SO_2$ oxidation rate suppressed to a level approximately equivalent to that of the test sample 5 (newly-made product). The $SO_2$ oxidation rate of the test sample 1 was satisfactorily reduced compared with those of the test sample 2 (screened product with the 0.074-mm mesh) and the test sample 3 (product without screening).

Moreover, the test sample 1 (screened product with the 0.5-mm mesh) can be recognized as a regenerated product made of recycled raw material because the test sample 1 contains approximately the same amount of $As_2O_3$, which was originated from the fly ash and so forth, as those of the other test samples 2 to 4. However, the test sample 1 demonstrated comparative performances to those of the test sample 5 that was a newly-made product containing no $As_2O_3$.

From the results described above, it was confirmed that the method of regenerating an exhaust gas treatment catalyst according to the present invention is capable of regenerating an exhaust gas treatment catalyst in which the lowering of the exhaust-gas treating performance and the oxidation of sulfur dioxide are suppress. It was also confirmed that the exhaust gas treatment catalyst according to the present invention is capable of demonstrating performances that are approximately equivalent to those of a newly-made exhaust gas treatment catalyst.

Industrial Applicability

A method of regenerating an exhaust gas treatment catalyst according to the present invention and an exhaust gas treatment catalyst obtained by the method are extremely useful and beneficial in various industries, since such a method and an exhaust gas treatment catalyst are capable of suppressing the lowering of the exhaust-gas treating performance and the oxidation of sulfur dioxide, and demonstrating performances approximately equivalent to those of a newly-made product.

The invention claimed is:

1. A method of regenerating an exhaust gas treatment catalyst having ash adhered to a surface thereof, the method characterized by comprising:
    a crushing step of crushing the exhaust gas treatment catalyst that has been used and has ash adhered to the surface thereof;
    a separating step of separating the crushed exhaust gas treatment catalyst into coarse pieces having a size exceeding a threshold size S and fine particles having a size not larger than the threshold size S;
    a pulverizing step of pulverizing the separated coarse pieces into a fine powder;
    a molding step of molding the pulverized fine powder as a raw material into an exhaust gas treatment catalyst without using the separated fine particles as the raw material; and
    a calcining step of calcining a molded precursor of the exhaust gas treatment catalyst,
    wherein the threshold size S has a value not smaller than 0.105 mm.

2. The method according to claim 1, wherein
    the crushing step is a step in which the exhaust gas treatment catalyst that has been used is crushed such that 70 to 95 wt % of the whole exhaust gas treatment catalyst that has been used becomes the coarse pieces having a size exceeding the threshold size S.

3. The method according to claim 2, wherein
    the threshold size S has a value not larger than 1.0 mm.

4. The method of according to claim 1, wherein
    the pulverizing step is a step in which the coarse pieces is pulverized such that the fine powder has an average particle diameter not larger than 0.1 mm.

5. The method according to claim 1, further comprising a treating step of treating exhaust gas from burned coal using the exhaust gas treatment catalyst after the calcining step.

6. The method according to claim 5, wherein the treating step is a step of treating nitrogen oxide in the exhaust gas.

7. The method according to claim 1, wherein
    a percentage of $Fe_2O_3$ in the coarse pieces separated in the separating step is 0.25 wt % or less.

8. The method according to claim 1, wherein
    the exhaust gas treatment catalyst is made of at least one metal oxide from titanium oxide ($TiO_2$), tungsten oxide ($WO_3$), and vanadium oxide ($V_2O_5$).

9. The method of regenerating an exhaust gas treatment catalyst according to claim 1, wherein
    the crushing step is a step in which the exhaust gas treatment catalyst that has been used and has the ash adhered to the surface thereof is crushed without being washed.

* * * * *